(12) United States Patent
Slovacek

(10) Patent No.: US 9,218,400 B2
(45) Date of Patent: Dec. 22, 2015

(54) MULTIDIMENSIONAL DATA REPRESENTATION

(71) Applicant: ZOOM INTERNATIONAL S.R.O., Prague (CZ)

(72) Inventor: Vaclav Slovacek, Prague (CZ)

(73) Assignee: ZOOM INTERNATIONAL S.R.O., Prague (CZ)

(*) Notice: Subject to any disclaimer, the term of this patent is extended or adjusted under 35 U.S.C. 154(b) by 0 days.

(21) Appl. No.: 14/295,334

(22) Filed: Jun. 4, 2014

(65) Prior Publication Data

US 2015/0120786 A1    Apr. 30, 2015

Related U.S. Application Data

(60) Provisional application No. 61/896,623, filed on Oct. 28, 2013.

(51) Int. Cl.
  *G06F 17/30* (2006.01)
  *G06F 7/00* (2006.01)

(52) U.S. Cl.
  CPC ................ *G06F 17/30554* (2013.01)

(58) Field of Classification Search
  CPC .......... G06F 19/3443; G06F 17/30563; G06F 17/30539
  USPC .................... 707/235, 251, 737, 738
  See application file for complete search history.

(56) References Cited

U.S. PATENT DOCUMENTS

| | | | |
|---|---|---|---|
| 6,442,748 B1* | 8/2002 | Bowman-Amuah | 717/108 |
| 6,542,895 B1* | 4/2003 | DeKimpe et al. | 707/999.101 |
| 7,636,433 B2 | 12/2009 | Noyan et al. | |
| 2007/0022000 A1 | 1/2007 | Bodart et al. | |
| 2008/0288889 A1* | 11/2008 | Hunt et al. | 715/810 |

* cited by examiner

*Primary Examiner* — Pavan Mamillapalli
(74) *Attorney, Agent, or Firm* — Galvin Patent Law; Brian R. Galvin

(57) ABSTRACT

A system for data aggregation and representation, comprising a data aggregator that may request or receive input from a plurality of data sources, a visualization engine that may generate representations of data, and an interaction manager that may handle interactions from an analyst, and a method for multidimensional representation of data.

4 Claims, 6 Drawing Sheets

MULTIDIMENSIONAL DATA REPRESENTATION

CROSS-REFERENCE TO RELATED APPLICATIONS

This application claims priority to U.S. provisional patent application Ser. No. 61/896,623, titled "MULTIDIMENSIONAL DATA REPRESENTATION", which was filed on Oct. 28, 2013, the entire specification of which is incorporated herein by reference.

BACKGROUND OF THE INVENTION

1. Field of the Art

The disclosure relates to the field of data analysis, and more particularly to the representation of multidimensional analysis graphs.

2. Discussion of the State of the Art

In the art of data analysis, it may often be necessary to view multiple variables for an entity (such as a variety of scoring metrics for an individual, or a variety of measurements of an organization's operation). Often, it is also desirable to view changes in such metrics in time, such as a progression or drill-down. Traditionally, such information is presented as a number of two-axis visual graphs common in the art, with additional visualizations or drill-downs to represent new data over time (essentially, each graph may represent a snapshot of a set of metrics at a given point in time, with multiple snapshots intended to represent a time period).

Such an approach may make it difficult for analysts to manage data, having a large number of similar visual presentations to monitor or track at once, and may introduce error. Furthermore, a series of snapshots may not be an adequate representation of change over time, as the gaps between snapshots may contain relevant information that is lost.

What is needed, is a means to represent a wider dataset in a unified manner, with the ability to present multiple variables simultaneously and the ability to display changes over time along with the data rather than requiring additional sets of data to be viewed and analyzed individually.

SUMMARY OF THE INVENTION

Accordingly, the inventor has conceived and reduced to practice, in a preferred embodiment of the invention, a system and method for multidimensional data representation.

According to a preferred embodiment of the invention, a system for multidimensional data representation comprising a data aggregator, visualization engine, and an interaction manager, is disclosed. According to the embodiment, a data aggregator may receive data from a number of input sources, such as software or hardware systems or devices, for example sensor data from a mobile device (such as a smartphone) or metric information from a monitoring software application (such as may be employed in a contact center to track operations). Data aggregation may be interchangeably passive or active in nature, such that (according to a particular arrangement and data input source) a data aggregator may request specific or general data from an input source (active, i.e. an aggregator makes active requests for data from sources, and data may only be provided when requested), or an input source may export data that may then be received by a data aggregator as it arrives (passive, i.e. sources supply a stream of data that an aggregator may receive from as desired, data being continually available regardless of whether it is being aggregated). In this manner a data aggregator may be utilized in conjunction with any of a variety of additional or alternate software or hardware devices that may be designed specifically for use according to the system of the invention, or may be pre-existing such as technologies common in the art, the nature of an aggregator being innately adaptable and scalable with regard to data sources.

According to the embodiment, a visualization engine may take aggregated data and formulate visual representations according to the type and quantity of data being presented, for example arbitrarily selecting additional visual cues to represent additional variables or dimensions of data being represented. For example, in a traditional two-dimensional graph, two variables may be represented as x and y axes for graphing data points, with the position of a particular point determined by the variable values. According to the embodiment, additional variables may be represented via a number of visual means, for example by representing data points with varying color (or color elements such as hue, saturation, brightness, or opacity), thickness or size, or by utilizing nontraditional point-plotting styles such as (in place of a simple dot, as is commonly used in traditional 2D graphs in the art) plotting a data source as a point with a "tail", or a leading/trailing line that may be used to represent historical values for a variable (i.e., change over time as an integral component of the graph). In this manner, an arbitrary quantity of variables and variable types (such as change over time) may be displayed in a single, unified visual representation for convenient and rapid review by an analyst.

According to the embodiment, an interaction manager may be utilized to receive user interactions, such as input from an analyst viewing data. Such input may vary in nature, such as (for example) selecting data inputs for display, configuring the manner in which data is represented, or manipulating a particular visual display of data (such as scrolling around a large graph for a large number of data inputs). In this manner, visual data representations may be considered to be interactive, increasing their usefulness by allowing an analyst to control various aspects of data review such as (for example) zooming in to view data in greater detail or granularity, or selecting particular data for display rather than (for example) viewing preselected data that may not be relevant in order to view particular desired data (such as having to view a preconfigured visualization of all metrics related to a particular contact center agent, when only a single metric such as call handle time is desired).

According to another preferred embodiment of the invention, a method for presenting data in a multidimensional visual manner, is disclosed. According to the embodiment, an analyst (such as a human user or automated software-based analysis program) may connect to a data representation system and provide any input if desired (such as preferences or configuration information, or requesting specific data sets for presentation). Data may then be loaded from a variety of sources, such as actively-requested data, passively-received data, or historical data that may be stored in a database, and all loaded data may then be analyzed to determine the manner in which to present it to an analyst. In this manner, data may be presented in an optimized fashion according to the data being presented and the analyst requesting it, such that each individual analysis yields optimum results. Data may then be presented, and if desired an analyst may interact with the presentation such as to navigate data as needed. It should be appreciated that in this manner an analyst may only be allowed to manipulate the representation of data, and not the data itself—thus preventing tampering with data values and preserving fidelity of the information being presented for review.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
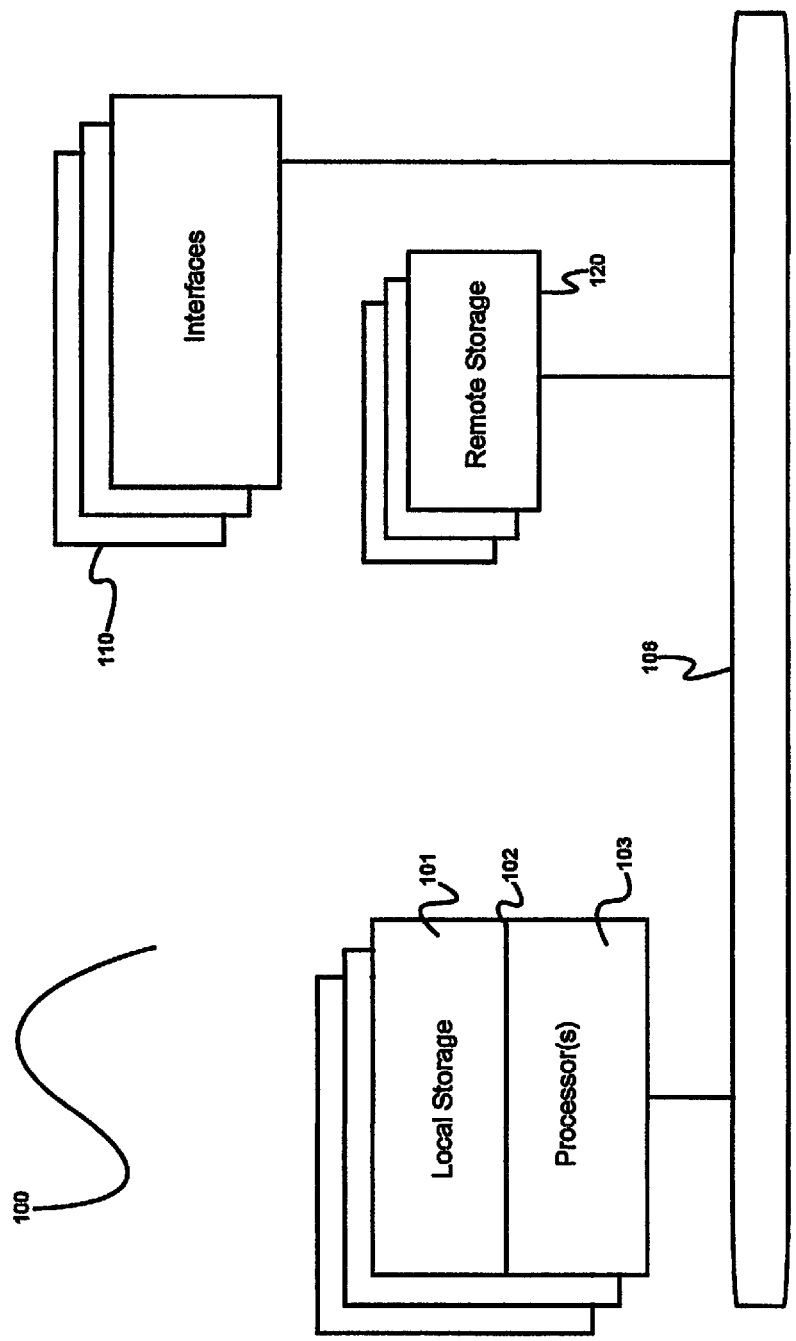
FIG. 1 is a block diagram illustrating an exemplary hardware architecture of a computing device used in an embodiment of the invention.

The inventor has conceived, and reduced to practice, a system and method for multidimensional data representation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
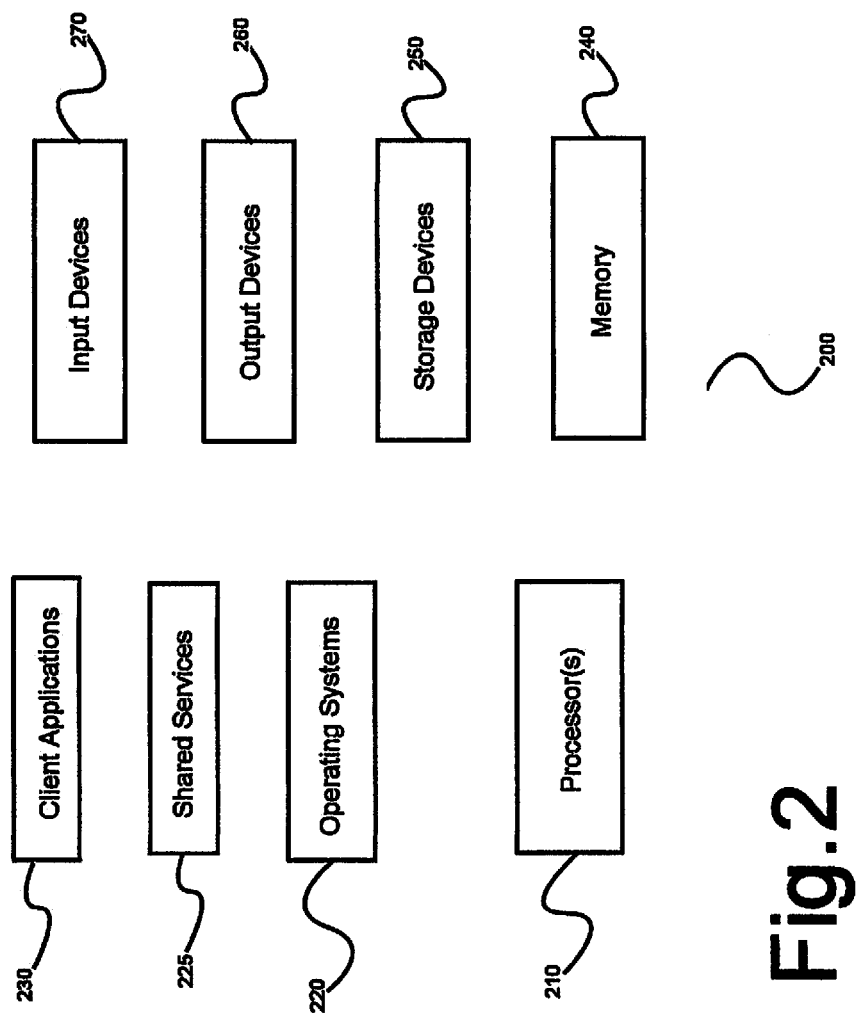
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
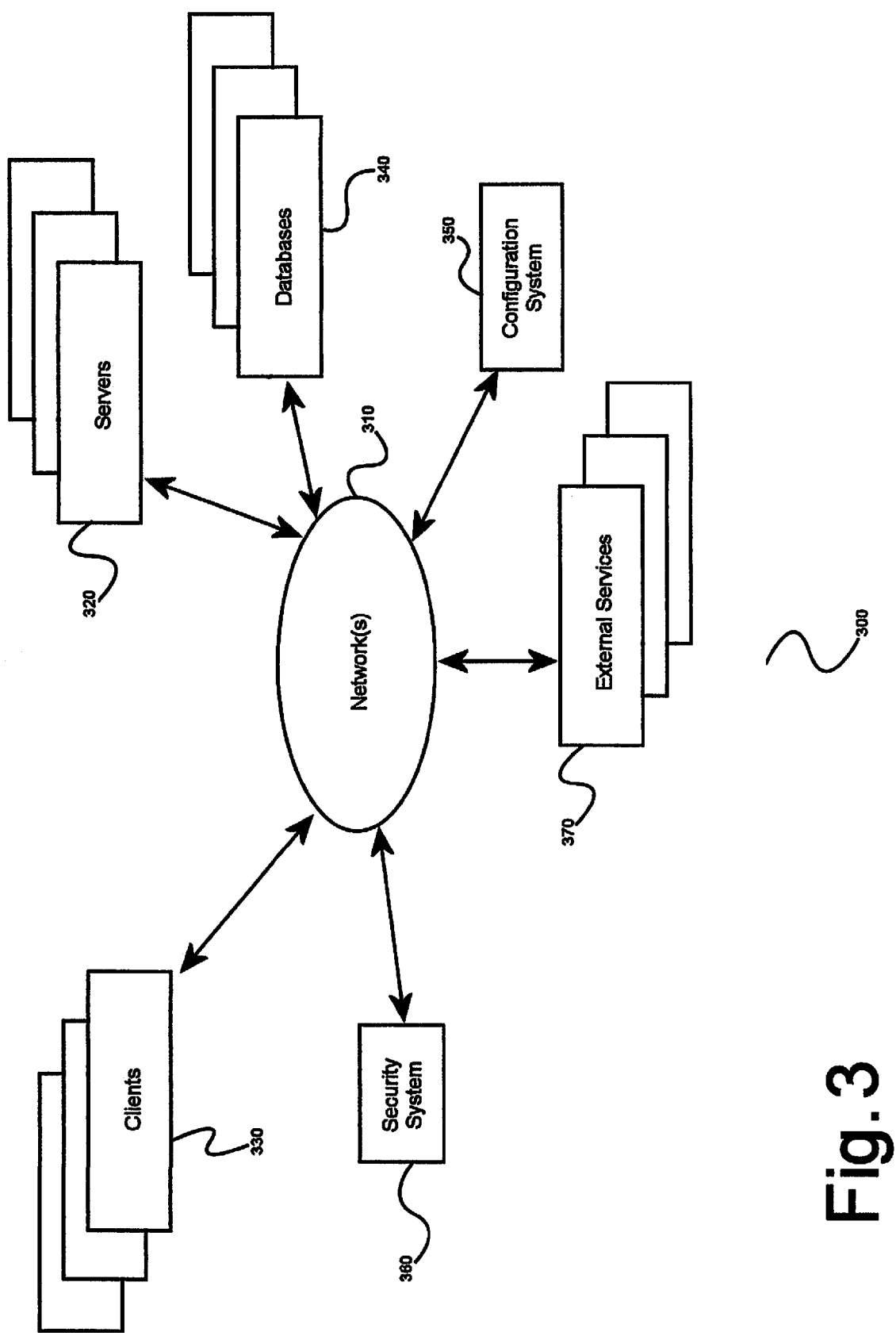
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
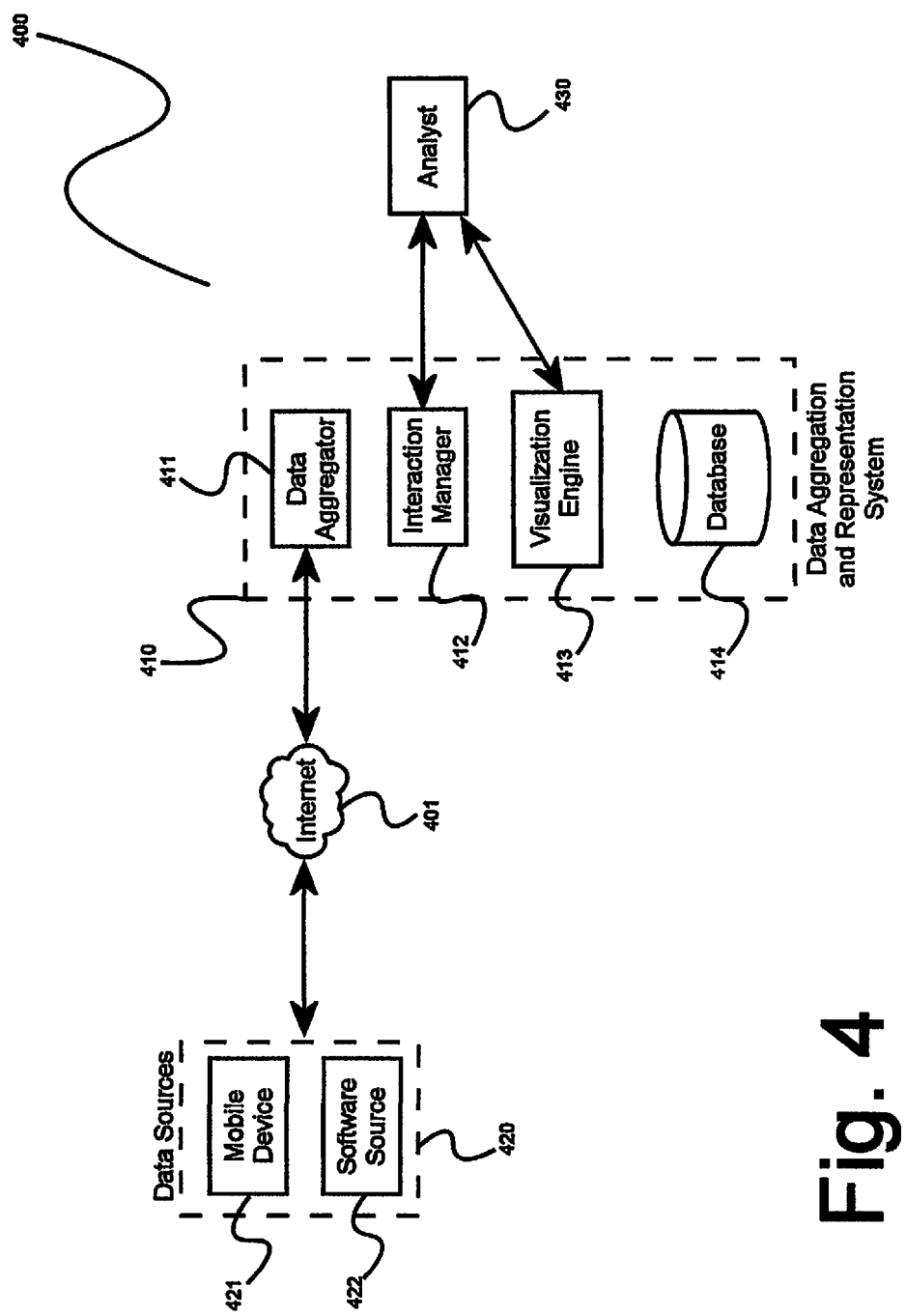
FIG. 4 is a block diagram of an exemplary system architecture for data aggregation and representation, according to a preferred embodiment of the invention.

FIG. 4 is a block diagram of an exemplary system architecture 400 for data aggregation and representation, according to a preferred embodiment of the invention. As illustrated, various components of a system 400 may be interconnected via a variety of means such as traditional physical communication means (such as cable connection or other direct hardware or software interaction) or may communicate via the Internet 401 or other data communications network interchangeably, and connections shown are illustrated as exemplary for the purpose of brevity in illustration.

As illustrated, a data aggregation and representation system 410 may comprise a data aggregator 411, that may receive data via either active or passive means from a plurality of similar or disparate data sources 420. Exemplary data sources as illustrated may be hardware devices or software applications or services interchangeably, such as (for example) a mobile computing device such as a smartphone 421 (that may, for example, produce data from physical hardware sensors such as magnetometers, accelerometers, microphones, or any other physically-interactive hardware component), data monitoring application 422 (such as software utilized by a business to monitor operations or employee activities, and that may produce data such as number or quality of customer interactions, server uptime, employee staffing levels, or any of a variety of desirable metrics as are commonly utilized in the art), or any of a variety of additional or alternate software or hardware that may produce data that may be desirable to collect and provide as a representation, as described below.

In an "active" aggregation scheme, a data aggregator 411 may communicate with a data source such as to request general or specific data, such as requesting input data from a particular sensor from a smartphone 421 (i.e., data aggregator 411 "actively" requests data from a source, and data may only be provided when requested). Such a scheme may be appropriate for contexts in which data may not be continuously available or communication bandwidth may be limited, such as (for example) a mobile device communicating over a limited data plan on a cellular communications network.

In a "passive" data aggregation scheme, data may be continuously or intermittently (such as, for example, in a regular manner such as scheduled data output) produced by a data source, and data aggregator 411 may receive data as needed (i.e., data is generally made available regardless of whether it is being aggregated, and data aggregator 411 may collect or otherwise receive data from what is available when needed). Such a passive scheme may be appropriate in contexts where a data source may provide data output to a number of external components such as additional data collectors or storage, and a data aggregator 411 may utilize a pre-existing data output for aggregation. In this manner it can be appreciated that a variety of data sources may be utilized interchangeably according to the invention, and the means by which data is aggregated may vary according to the nature of data or a particular data source, as appropriate.

As illustrated, data aggregation and representation system 410 may further comprise a database 414, that may be any appropriate hardware or software-based storage means as are common in the art, such as hardware-based integral or removable storage media (such as optical storage, i.e. DVD or other storage disc, or magnetic storage such as tape-based storage media or a hard disk drive) or software-based data storage schema (such as any appropriate database architecture, for example SQL™ or similar database structures common in the art), as appropriate. Such storage may be utilized by various components of a system 410 for storing relevant information such as configuration or operation information, as well as optionally being used to store data from various data sources 420 or a data aggregator 411 such as for future reference or use. In this manner, it can be appreciated that data need not be utilized immediately to remain relevant, and may be stored for future use in generation of data representations as described below. For example, in a passive aggregation context a data stream may be stored such that data may be immediately utilized (i.e., representation of "live" or real-time data), or previous or "historical" data may be retrieved from storage for representation (i.e., presenting historical data alongside or in place of live data, such as a time-enhanced representation as described below).

As illustrated, a data aggregation and representation system 410 may further comprise a visualization engine 413, that may be any hardware or software-based device or application that may receive data (such as live data from a data aggregator 411 or stored data from a database 414) for use in creation and presentation of data representations for review by an analyst 430. It should be appreciated by one having skill in the art that analyst may be either a human user (i.e., a human individual utilizing system 400 for viewing representations of electronic data) or a software or hardware component capable of utilizing data representations, such as an automated or artificial intelligence (AI) based data analysis system or service. It should be further appreciated that data representations may vary in nature according to the nature of data being represented or the nature of a particular analyst 430, such as organizing data for convenient visual presentation to a human user or for more efficient electronic parsing by a software analyst. Data representations, according to the invention, may be any suitable representation of data for review such as, but not limited to, visual presentations of data (such as a graph or histogram) or text-based summaries of data (such as a text-based data report), interchangeably. However it is the inventor's opinion that the most utility may be gained from use of a visual representation in conjunction with a human analyst, as is a common arrangement in the art (for example, a contact center operations manager viewing real-time or historical performance data regarding a contact center or its agents).

As illustrated, data aggregation and representation system 410 may further comprise an interaction manager 412, that may receive interaction requests from an analyst 430 for use in determining system operations. For example, in an arrangement utilizing a human analyst 430, analyst 430 may be able to request particular data for inclusion or exclusion in a representation (i.e., "show me x, but not y"), or manipulate representation of data such as scrolling or zooming to alter visual elements being presented (such as increasing data granularity or altering a displayed timeframe for data), or any other appropriate interaction between a human user and an electronic system presenting data for analysis or review. In an arrangement utilizing a software analyst 430, analyst 430 may submit information regarding function or operation such as the manner in which it processes data representations for improved efficiency, or requests for particular data to be included or excluded from a representation, or any other appropriate electronic interaction as may be appropriate for facilitating efficient and relevant operation.

In this manner, it can be appreciated that the nature of system 400 is such that it may be readily adapted to a wide variety of existing and hypothetical arrangement of data sources and human or nonhuman analysts, as may be appropriate for any particular arrangement. It should be further appreciated that various additional or alternate components may be utilized according to the invention, such as addition of additional software or hardware technologies to improve function, such that a system 400 may be suitably scalable with regard to size or nature of arrangements as well as being "future-proof" and suitable for operation with various technologies that are available or may become available in the art.

DETAILED DESCRIPTION OF EXEMPLARY EMBODIMENTS

Figure 5:
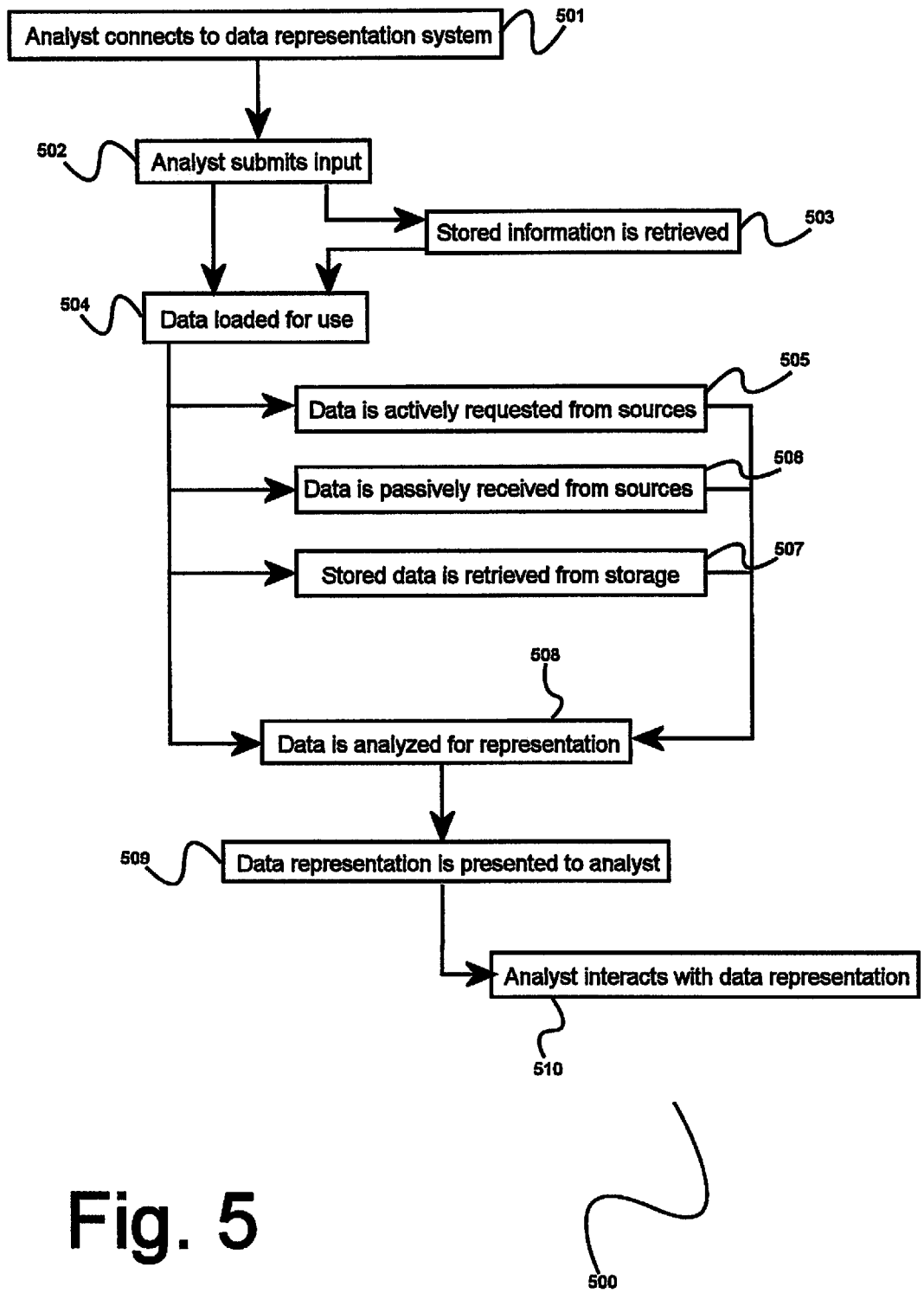
FIG. 5 is a method flow diagram illustrating an exemplary method for generation of a multidimensional data representation, according to a preferred embodiment of the invention.

FIG. 5 is a method flow diagram illustrating an exemplary method 500 for representation of multidimensional data, according to a preferred embodiment of the invention. In an initial step 501, an analyst may connect to a data representation system, such as a system previously described according to a preferred embodiment of the invention (referring to FIG. 4). As previously described, an analyst may be a human user interacting with a system to review or analyze data, or may be a software analyst performing automated or interactive analysis, such as scheduled analysis of data requiring no human interaction or semi-automated analysis performed on behalf of a human user (for example, in an exemplary arrangement a human user may interact with multiple systems simultaneously, each system operating a software analyst that handles specific operations on behalf of the user).

In a next step 502, an analyst may submit input such as preferences for configuration or operation (for example, a human user might specify how they desire data to be displayed, or a software analyst might send information pertaining to data format or communication bandwidth), such as might be received and utilized by an interaction manager as described previously (referring to FIG. 4). In a next sub-step 503, stored information may be retrieved such as from a database or other data storage, for example known configuration or preferences that may be loaded to improve interaction with an analyst (for example, a human user may have a stored profile, or previous settings for a software analyst may be retained to speed up and improve future interactions).

In a next step 504, data may be loaded for presentation to an analyst. As illustrated in next sub-steps 505 and 506, data may be requested from data sources in an active context, or accessed passively from an input stream in a passive context, both modes of operation having been described in detail previously (referring to FIG. 4). In a third sub-step 507, data may be retrieved from storage such as a database, such as to provide historical data as may be desirable to an analyst for inclusion in a data representation.

In a next step 508, data may be analyzed such as to determine optimal representation means, optionally utilizing any interactive preferences or requirements from a previous step 502, such as (for example) configuring the appearance of data points in a graph or other visual data representation. Such representation may utilize multiple variables simultaneously, adapting to the number and type of variable data for each data source as needed to create a unified representation of all desired data. For example, an analyst may request a number of data sources (such as contact center agents being reviewed for performance), and a number of data variables for each source (such as scored metrics for agents, for example average call handle time, longest call handled, number of calls handled, or customer satisfaction survey score information). According to the results of analysis in the example, a representation might present each contact center agent as a colored dot on a two-axis graph, each axis and dot color representing a separate data variable (i.e., the position and color of a dot indicate the values of three variables). For example, the (x, y) position of an agent's dot in a graph might represent their number of calls handled and average call handle time, respectively (such that by simply viewing the position of agents in a graph, a ratio of performance may be inferred). Dot color may, for example, correspond to an individual agent's longest call handle time, indicating any potentially-relevant statistical outliers. Additional information such as (for example) customer satisfaction scores may be represented as further visual indicators, such as utilizing (rather than a simple solid dot) a semitransparent dot wherein the opacity of a dot may represent an agent's satisfaction quality score. In this manner it can be appreciated that by increasing and varying visual indicators, a large quantity and variety of data variables may be represented for rapid viewing.

In a final step 509, a formulated data representation may be presented to an analyst for viewing or interaction. In a sub-step 510, an analyst may interact with a representation such as to scroll or manipulate a viewing window or other display, or altering the granularity of data being viewed such as by zooming in on a graph to view in more detail. It should be appreciated that any interactions may be limited only to the representation of data, and data itself may not be manipulated so as to preserve fidelity of data and prevent tampering.

Figure 6:
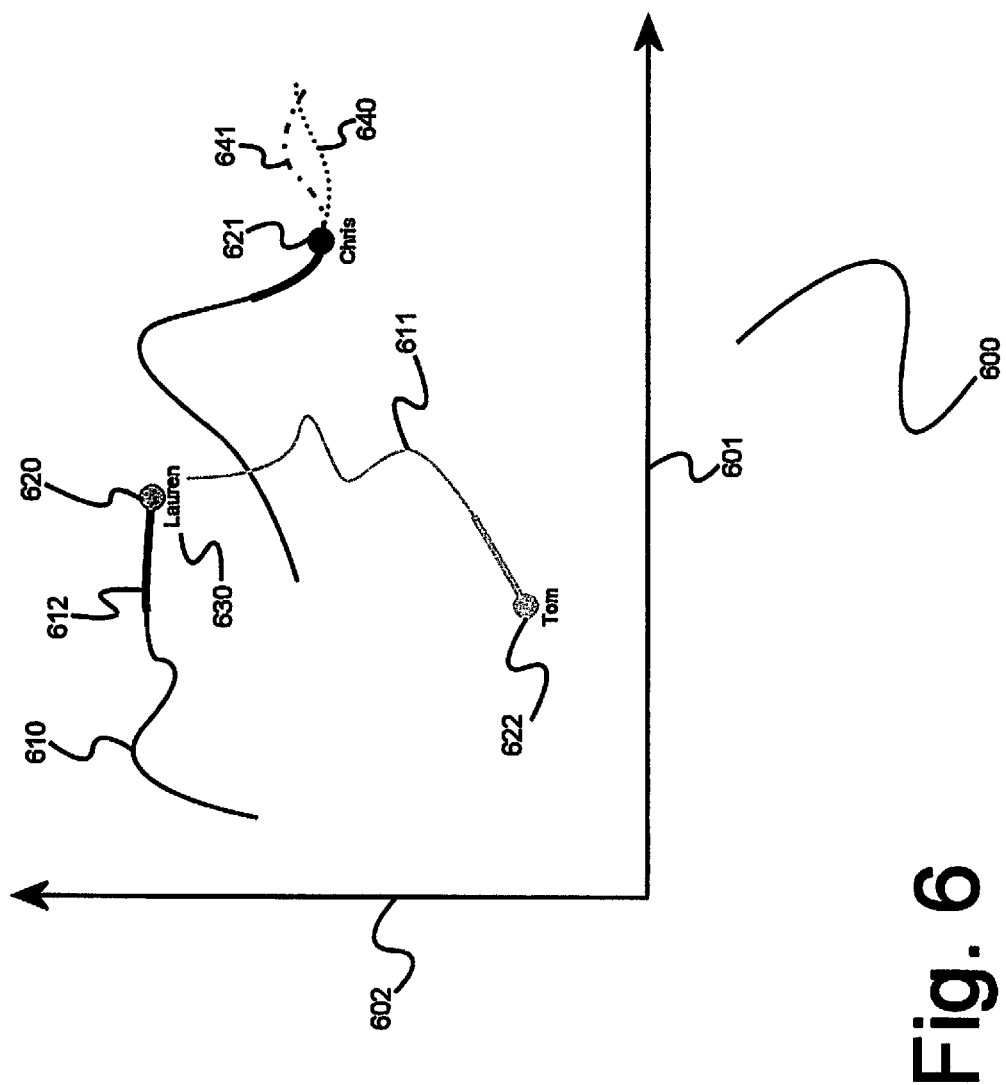
FIG. 6 is an illustration of an exemplary multidimensional data visualization utilizing multiple data sources with multiple variables, according to an embodiment of the invention.

FIG. 6 is an illustration of an exemplary visual multidimensional graph 600 of a plurality of data sources, each with a plurality of variable data values being represented, according to an embodiment of the invention. As illustrated, a data representation may be presented in the form of a two-axis visual graph 600, as is commonly used in the art for displaying variable data in an easy to digest format.

In an exemplary use case (as illustrated), one axis 601 may represent a single metric such as a contact center agent's total number of calls handled in a given timeframe, and a second axis 602 may represent a second, possibly correlated, metric such as an agent's customer satisfaction survey scores (enabling an analyst to determine, for example, any performance impact of increased call load on a per-agent basis). As illustrated, change over time may be implemented using historical data (such as might be stored from previous data streams or requests, as described previously referring to FIG. 4 and FIG. 5), and may be presented (for example) as a "tail" or line 610 representing a progression of data values over time. Accordingly, in the present example it can be visually inferred that exemplary contact center agent "Chris" has a peak ratio of call volume to customer satisfaction where his performance may be optimized, whereas "Lauren" is fairly consistent except at low-volume times, and "Tom" is in a performance decline regardless of call volume, which may be indicated via visual alteration of a correlated time-value tail 611. Each time-value tail may be varied visually, such as altering thickness to show more recent data 612, such as values from within the last week (in an exemplary instance where a graph 600 is displaying a larger timeframe overall, such as agent performance over the previous month).

Furthermore, the most recent data for any given source may be indicated by a fixed "dot" or point 620 at one end of a time-value tail, indicating the most recent (or current) set of data. Dots may be varied visually to represent additional metrics, such as (for example) varying the opacity of dots (as illustrated) to represent higher 621 or lower 622 average call handle times for an individual agent. Additionally, data points may be labeled such as indicating a contact center agent's name 630 for easier understanding of presented data.

Additionally, as illustrated predicted future data may be optionally displayed, such as in a visually distinct manner to prevent confusion, for example as a dotted line 640 displayed in front of a data point 620 to indicate potential future data. In this manner, historical or recent data may be analyzed to determine likely future values, such as (for example) estimating the impact of changes made such as additional training for employees, altering scheduling, or other changes that may affect data, as may be estimated based on observed previous data changes based on similar changes (such as if other employees had previously taken the training and the results were observed). Furthermore, multiple predicted data sets may be displayed alternatively or simultaneously such as by varying dotted and dashed lines 641 to indicate alternate outcomes, such as if multiple changes are being considered (for example, two different sets of training for an employee, each of which having been previously given to other employees to collect observed data from to form a prediction). In this manner an analyst may make more informed decisions regarding data by viewing potential courses of action, allowing a more relevant review of both historical data and potential future data to determine a preferred course of action or to form more accurate analysis.

In this manner, various visual cues may be utilized to enable rapid analysis of a large data set, such as multiple metrics for multiple data sources (in the example, contact center agents). This may enable analysts to rapidly infer an overview of data as well as presenting as much data as may be desired in a single, unified manner rather than requiring an analyst to view multiple data graphs or other representations, or consult external resources to find details that may not be available in a simpler, non-multidimensional representation as is common in the art. By including time-value data as illustrated, analysis can be further enhanced by enabling analysts to quickly view specific events or changes in data, as well as what may have led up to an event and any outcomes reflected in the data (in the example, it can be seen that there is a specific point at which the number of calls received causes a performance decline in agent "Chris").

Any particular representation of data 600 may be made interactive for an analyst, as described previously (referring to FIG. 4 and FIG. 5). For example according to an illustrated example, a human user may be allowed to zoom in to increase granularity of data, such as to view more detailed performance of an individual contact center agent or to view minor variations in data that may not be immediately visible. Additionally, additional or alternate data may be presented based on interactions, such as displaying an exact call handle time at any given point along a time-value tail 610 when an analyst hovers or clicks on a point along the tail with their mouse (or other computer input device). It should be further appreciated that the nature of interaction may vary according to a particular representation, a particular analyst, or various input means available or being utilized. For example, a human user may manipulate the visual presentation of data using a suitable three-dimensional or spatially-capable input device, such as a LEAPMOTION™ input device, allowing the analyst to navigate or manipulate a data representation by moving their hands, fingers, or physical objects or input devices in a three-dimensional space (effectively allowing three-dimensional gesture-based interaction). It should be appreciated that by varying the particular nature of data representation as well as acceptable means of interaction, data may be made more accessible according to various configurations of input hardware and it should be further appreciated that in this manner any of a wide variety of hardware input devices may be utilized according to the invention.

The skilled person will be aware of a range of possible modifications of the various embodiments described above. Accordingly, the present invention is defined by the claims and their equivalents.

What is claimed is:

1. A system for data aggregation and representation, the system comprising:
an application running on a computer comprising at least a memory and a processor and further comprising programmable instructions stored in the memory and operating on the processor, the programmable instructions adapted to implement a data aggregation and representation system comprising:
a data aggregator;
a visualization engine; and
an interaction manager;
wherein the data aggregator receives data from a plurality of data sources that may be interchangeably passive or active;
wherein the data aggregator presents the data to the visualization engine;
wherein the visualization engine produces representations of the data for viewing by a human user;
wherein the visualization engine represents data using a two-dimensional curve representing a plurality of time-ordered data points;
wherein a successive data point is appended to an end of the curve associated with more-recent data points;
wherein a plurality of recent data points are displayed as dots of increasing size with increasing recency and each data point has a translucency value based on a value for that data point along a third dimension; and
wherein the interaction manager handles interaction from the human user.

2. The system of claim 1, wherein the data aggregator requests data from external sources.

3. The system of claim 1, wherein the data aggregator receives data from streaming sources.

4. The system of claim 3, wherein stored data is used by the visualization engine to represent historical values.

* * * * *